(12) United States Patent
Widener et al.

(10) Patent No.: US 9,062,883 B2
(45) Date of Patent: Jun. 23, 2015

(54) TURBOMACHINE FUEL-AIR MIXER COMPONENT INCLUDING AN ADDITIVELY MANUFACTURED PORTION JOINED TO A NON-ADDITIVELY MANUFACTURED PORTION AND METHOD

(71) Applicant: General Electric Company, Schenectady, NY (US)

(72) Inventors: Stanley Kevin Widener, Greenville, SC (US); Attila Szabo, Encinitas, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 202 days.

(21) Appl. No.: 13/911,348

(22) Filed: Jun. 6, 2013

(65) Prior Publication Data
US 2014/0361447 A1   Dec. 11, 2014

(51) Int. Cl.
| | |
|---|---|
| *B01F 3/04* | (2006.01) |
| *F02C 1/00* | (2006.01) |
| *F02G 3/00* | (2006.01) |
| *F23R 3/04* | (2006.01) |
| *F23R 3/28* | (2006.01) |

(52) U.S. Cl.
CPC ............. *F23R 3/04* (2013.01); *Y10T 29/49229* (2015.01); *F02G 3/00* (2013.01); *F02C 1/00* (2013.01); *B01F 3/04* (2013.01); *F23R 3/286* (2013.01)

(58) Field of Classification Search
CPC ................ B01F 3/04; F02C 1/00; F02G 3/00; F23R 3/286
USPC ........................ 261/20; 60/734, 737
See application file for complete search history.

(56) References Cited

U.S. PATENT DOCUMENTS

| | | | |
|---|---|---|---|
| 4,117,302 A | 9/1978 | Earle et al. | |
| 7,261,550 B2 | 8/2007 | Herzog | |
| 8,147,121 B2* | 4/2012 | Lacy et al. | .................... 366/134 |
| 8,424,311 B2* | 4/2013 | York et al. | ...................... 60/737 |

* cited by examiner

*Primary Examiner* — Robert A Hopkins
(74) *Attorney, Agent, or Firm* — Cantor Colburn LLP

(57) ABSTRACT

A turbomachine fuel-air mixer component includes a first component portion formed from a non-additive manufacturing process. The first component portion includes a plurality of tube elements each having an end portion. A second, additively manufactured component portion is additively joined to the first component portion. The second, additively manufactured component portion includes a plurality of additively manufactured tube sections constructed at, and fluidically connected with, respective ones of each end portion of the plurality of tube elements. The first and second component portions collectively defining at least a portion of the turbomachine fuel-air mixer component.

20 Claims, 6 Drawing Sheets

US 9,062,883 B2

TURBOMACHINE FUEL-AIR MIXER COMPONENT INCLUDING AN ADDITIVELY MANUFACTURED PORTION JOINED TO A NON-ADDITIVELY MANUFACTURED PORTION AND METHOD

BACKGROUND OF THE INVENTION

The subject matter disclosed herein relates to the art of component fabrication and, more particularly, to a turbomachine fuel-air mixer component including an additively manufactured portion and a non-additively manufactured portion.

There exists a wide array of available techniques for forming components. Components may be formed from molding, machining, and the like. Molding relies upon a liquid material to be poured or injected into a mold. The liquid material solidifies forming a component. The component may be further finished if so desired. Machining is a subtractive manufacturing process that employs cutters and the like to remove material from a substrate to form a component. Another process currently in use is additive manufacturing or 3-D printing. In additive manufacturing, a component is formed one layer at a time. More specifically, a layer of powder material is deposited onto a substrate, and melted through exposure to heat, a laser, an electron beam or some other process and subsequently solidified. Once solidified, a new layer is deposited, solidified, and fused to the previous layer until the component is formed.

BRIEF DESCRIPTION OF THE INVENTION

According to one aspect of an exemplary embodiment, a turbomachine fuel-air mixer component includes a first component portion formed from a nonadditive manufacturing process. The first component portion includes a plurality of tube elements each having an end portion. A second, additively manufactured component portion is additively joined to the first component portion. The second, additively manufactured component portion includes a plurality of additively manufactured tube sections constructed at, and fluidically connected with, respective ones of each end portion of the plurality of tube elements. The first and second component portions collectively define at least a portion of the turbomachine fuel-air mixer component.

According to another aspect of the exemplary embodiment, a method of forming a turbomachine fuel-air mixer component includes forming a first component portion of the turbomachine fuel-air mixer component through a non-additive manufacturing process. The first component portion of the turbomachine fuel-air mixer component has a plurality of tube elements each including an end portion. The method also includes additively manufacturing a second component portion of the turbomachine fuel-air mixer component onto the first turbomachine fuel-air mixer component. The second turbomachine fuel-air mixer component includes a plurality of additively manufactured tube sections that extend from respective ones of the end portions of the plurality of tube elements.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
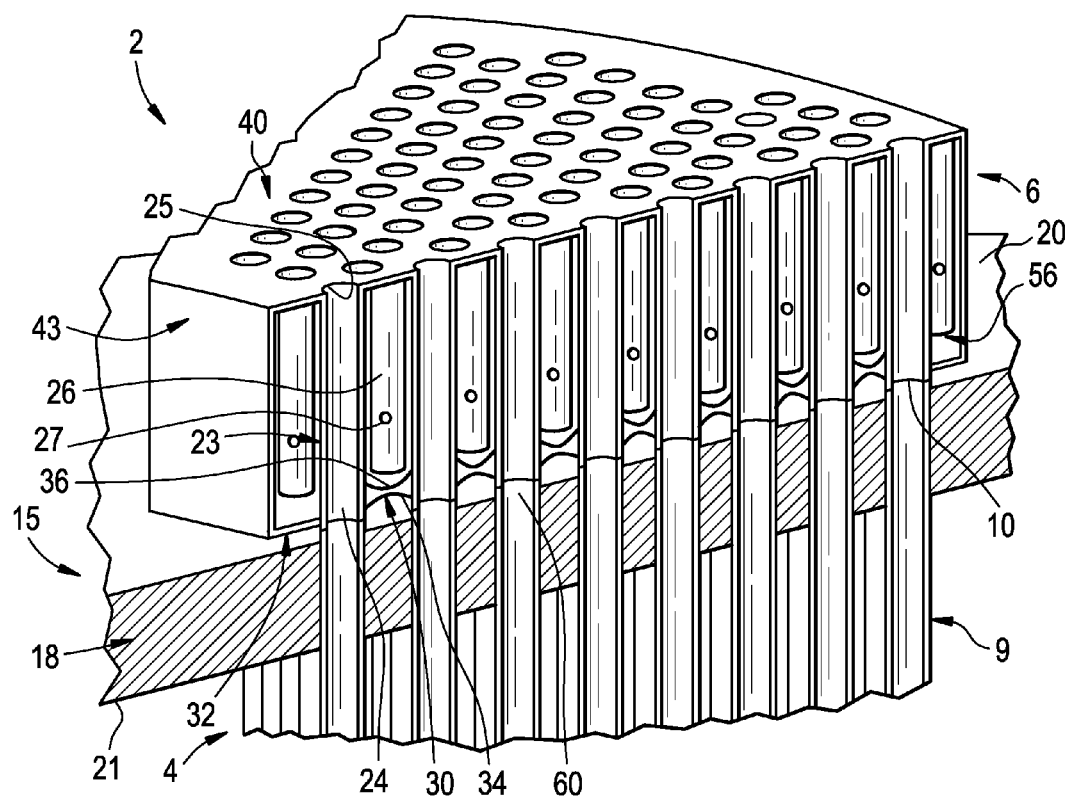
FIG. 1 is a partial perspective view of a turbomachine fuel-air mixer including a first component portion formed from a non-additive manufacturing process joined to a second component portion having a plurality of additively manufactured tube sections.
Figure 2:
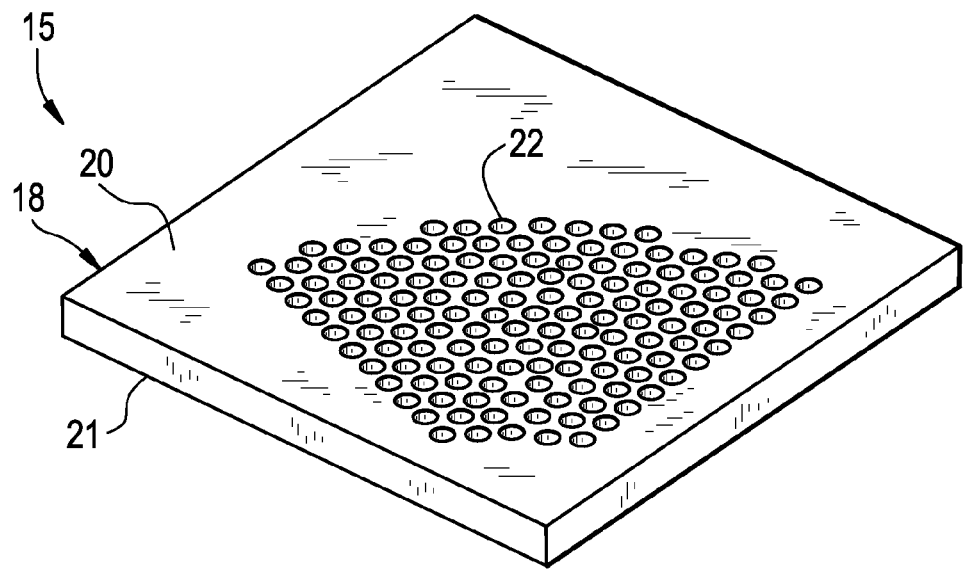
FIG. 2 is a perspective view of an alignment fixture configured to support the first component portion.
Figure 3:
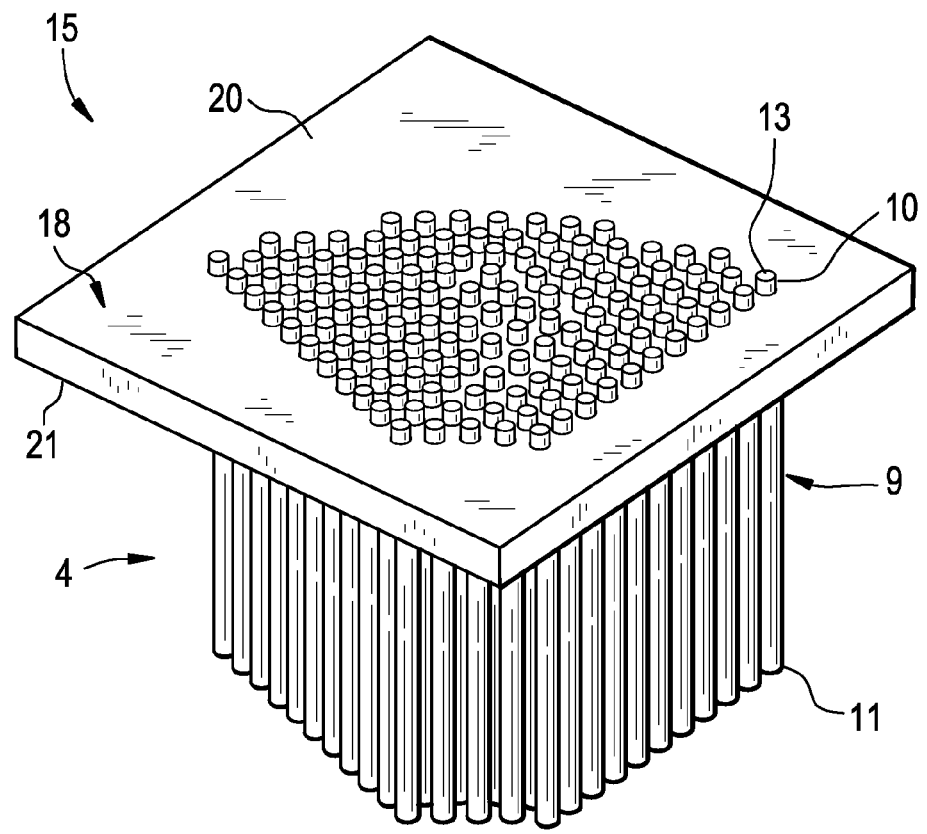
FIG. 3 is a perspective view of the first component portion supported in the alignment fixture of FIG. 2.
Figure 4:
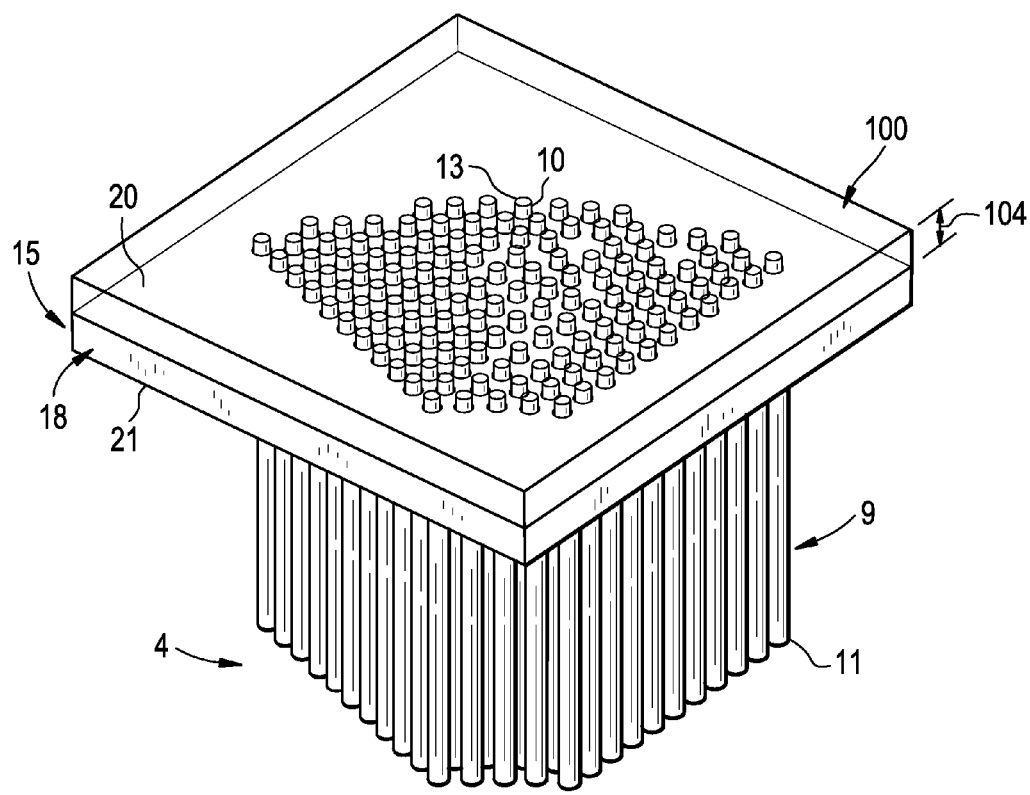
FIG. 4 depicts an additive manufacturing medium covering the first component portion and alignment fixture of FIG. 3.
Figure 5:
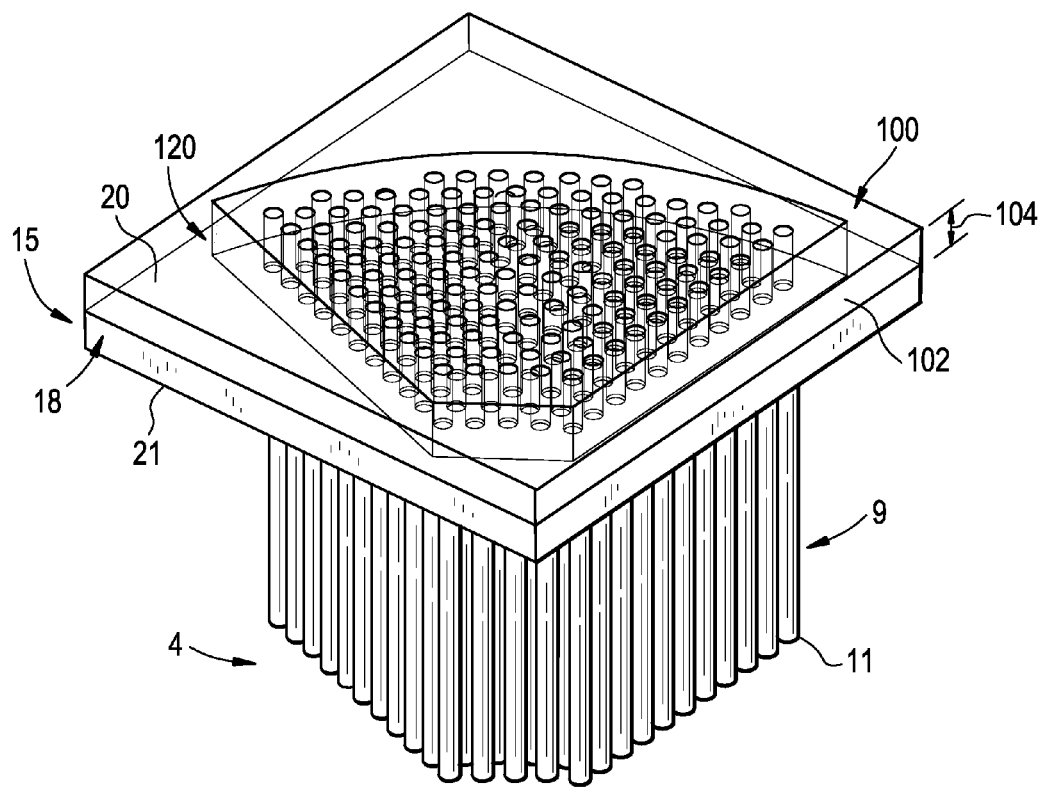
FIG. 5 depicts a first section of the second component portion being formed in the additive manufacturing medium of FIG. 4.

A turbomachine fuel-air mixer component in accordance with an exemplary embodiment is indicated generally at 2 in FIG. 1. Turbomachine fuel-air mixer component 2 includes a first component portion 4 and a second, additively manufactured component portion 6. Second, additively manufactured component portion 6 is additively joined to first component portion 4. The term "additively joined" should be understood to describe that second, additively manufactured component portion 6 is both manufactured by, and joined to, first component portion 4, through an additive manufacturing process that will be detailed more fully below. Turbomachine fuel-air mixer component 2 may also include additional component portions (not shown). First component portion 4 includes a plurality of tube elements, one of which is indicated at 9. Each tube element 9 extends from a first end portion 10 to a second end portion 11 (FIG. 3). Each first end portion 10 includes a first end face 13.

In accordance with one aspect of the exemplary embodiment, each of the plurality of tube elements 9 is fixed in position by a locating plate 15. Locating plate 15 includes a body 18 having first surface 20 and an opposing, second surface 21. A plurality of openings 22 extend through first and second surfaces 20 and 21. Each of the plurality of openings 22 receives a respective one of the plurality of tube elements 9, as shown in FIG. 3. Tube elements 9 are positioned in openings 22 such that first end portion 10 projects beyond first surface 20. Tube elements 9 are tightly fit with openings 22 to maintain a desired positioning.

Second, additively manufactured component portion 6 includes a plurality of additively manufactured tube sections 23 that are built onto first end portions 10, and register with, corresponding ones of the plurality of tube elements 9. As will become more fully evident below, the term "additively manufactured" should be understood to describe components that are constructed by forming and solidifying successive layers of material one on top of another. Each of the additively manufactured tube sections 23 extends from a first end section 24 to a second end section 25 through an intermediate section 26. Intermediate section 26 includes at least one opening 27. Each first end section 24 is joined to an additively manufactured connecting web 30. An additively manufactured peripheral flange 32 is also additively manufactured to outer ones of the plurality of additively manufactured tube sections 23 at each first end section 24. Each additively manufactured web 30 includes first and second curvilinear surfaces 34 and 36 that provide enhanced structural integrity.

In addition, second end section 25 is additively manufactured with an additively manufactured end plate 40. Further, second, additively manufactured component portion 6 includes an additively manufactured side plate 43 that extends between first peripheral flange 32 and additively manufactured end plate 40. Additively manufactured side plate 43 circumscribes second, additively manufactured component portion 6. However, it should be understood that second, additively manufactured component portion 6 could include inner and outer additively manufactured side plates in accordance with other aspects of the exemplary embodiment. Second, additively manufactured component portion 6 may include additional additively manufactured side plates (not shown). Additively manufactured webs 30, first and second peripheral flanges 32 and 32, first and second additively manufactured side plates 43 and 44 and additively manufactured end plate 40 define a plenum 56 that surrounds the plurality of additively manufactured tube sections 23. Plenum 56 may contain a fluid, for instance gaseous fuel that is passed into the plurality of additively manufactured tube sections 23 via openings 27.

As discussed above, first component portion 4 is formed from a non-additive manufacturing process. Each of the plurality of tube elements 9 are inserted into, or aligned with, a corresponding one of openings 22 and fixed in position by locating plate 15. A removable plug 60, such as steel wool, cloth, or other substance may be introduced into each first end portion 10 of tube elements 9. Second, additively manufactured component portion 6 is then additively manufactured upon, or to, first component portion 4. At this point, locating plate 15 and tube elements 9 are positioned in processing chamber (not shown) to begin an additive manufacturing process forming second, additively manufactured component portion 6. The first layer of additively manufactured component portion 6 only adheres to, or bonds with, first end faces 13 of first end portions 10 that project beyond first surface 20 of locating plate 15.

Figure 6:
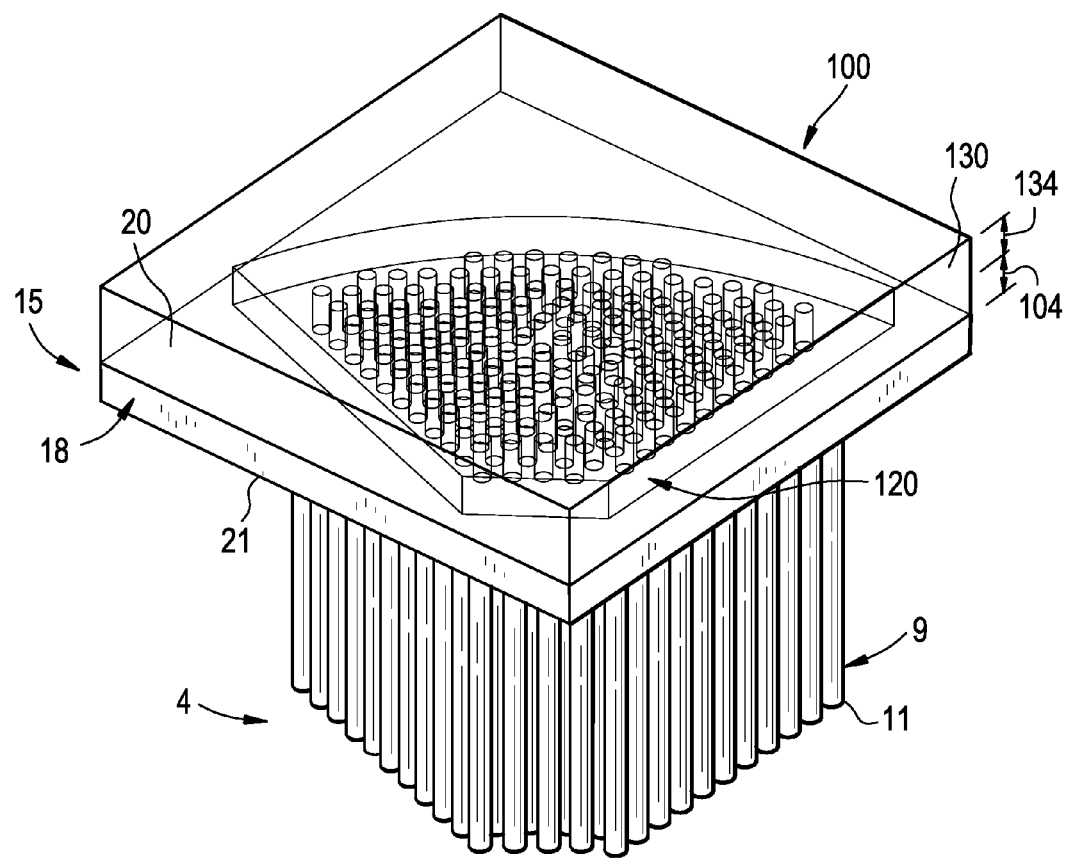
FIG. 6 depicts an additional additive manufacturing medium covering the first section of the second component portion of FIG. 5.
Figure 7:
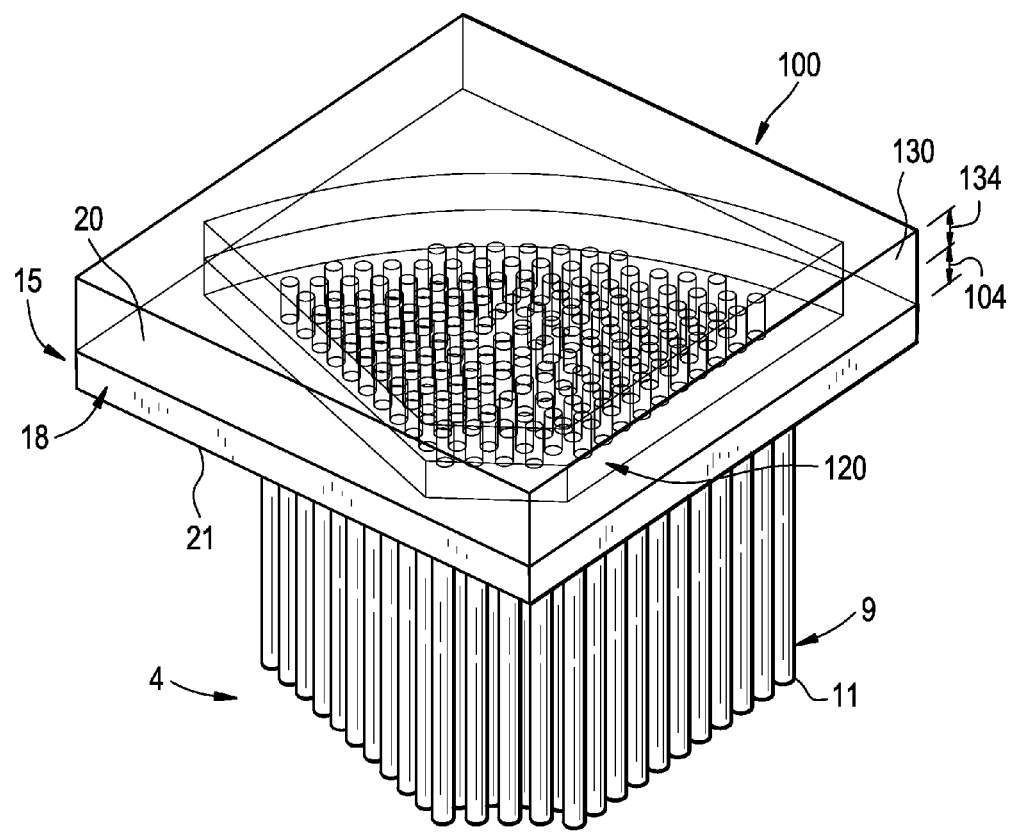
FIG. 7 depicts a second section of the second component portion formed in the additional additive manufacturing medium of FIG. 6.

In the processing chamber, first surface 20 of locating plate 15, along with first end portions 10 of tube elements 9 are covered by an additive manufacturing medium 100 forming a first layer 102 having a first depth 104. Removable plugs 60 prevent additive manufacturing medium 100 from entering tube elements 9. Upon completion of the additive manufacturing process, removable plugs 60 may be withdrawn. Additive manufacturing medium 100 may be in the form of a powder or polymer and could include cobalt-chrome (Co—Cr). In accordance with an aspect of the exemplary embodiment, a selective laser melting process begins to form second, additively manufactured component portion 6. More specifically, a laser beam is traced across the surface of additive manufacturing medium 100 forming a first section 120 of second, additively manufactured component portion 6. The laser beam fuses first section 120 to first end faces 13 of tube elements 9 as shown in FIG. 6.

At this point, additional additive manufacturing medium 100 is positioned upon first layer 102 forming a second layer 130 having a second depth 134. The laser beam is traced across the surface of the additional additive manufacturing medium 100 forming a second section 140 of second, additively manufactured component portion 6. Second section 140 is fused to first section 120. Successive layers of additive manufacturing material are added and acted upon by the laser beam until second, additively manufactured component portion 6 is fully formed. Webs 30 may be formed as part of first section 120 of additive manufacturing, or may be formed in subsequent sections. Upon completion of manufacture of second, additively manufactured component portion 6, first component portion 4 and second, additively manufactured component portion 6 may be removed from locating plate 15 as an assembly.

In an alternate embodiment, in lieu of additively manufactured connecting webs 30, a plate (not shown), may be formed by conventional manufacturing methods and assembled to the first end portions 10 of tube elements 9 prior to the additive manufacturing step. In such an embodiment, first end portions 10 of tube elements 9 could be joined to the plate (not shown) by additive manufacturing, brazing, or other component joining process.

At this point it should be understood that the exemplary embodiment describes a turbomachine fuel-air mixer component having an additively manufactured portion and a method of additively manufacturing a turbomachine fuel-air mixer component. It should also be understood that the method described herein could be employed to produce other new turbomachine components, or repair broken/worn turbomachine components. It should also be understood that while described as using a laser, other inputs could be used to act upon, and solidify, the additive manufacturing material. Also, it should be understood that the relative size of the layers illustrated in FIGS. 5-8 are for exemplary purposes and to aid in a better understanding of the method described in the application. In actuality, each layer may have a thickness of about 20 microns to about 60 microns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbomachine fuel-air mixer component comprising:
a first component portion formed from a non-additive manufacturing process, the first component portion including a plurality of tube elements each having an end portion including an end face; and
a second, additively manufactured component portion additively joined to the first component portion, the second, additively manufactured component portion including a plurality of additively manufactured tube sections constructed at, and fluidically connected with, respective ones of each end portion of the plurality of tube elements, the first and second component portions collectively defining at least a portion of the turbomachine fuel-air mixer component.

2. The turbomachine fuel-air mixer component according to claim 1, further comprising: a locating plate including a first surface, an opposing second surface and a plurality of openings extending between the first and second surfaces, the plurality of openings being configured and disposed to receive corresponding ones of the plurality of tube elements.

3. The turbomachine fuel-air mixer component according to claim 1, wherein the end portion of each of the plurality of tube elements projects beyond the first surface of the locating plate.

4. The turbomachine fuel-air mixer component according to claim 1, wherein the second component portion includes a plurality of additively manufactured connecting webs joining the plurality of additively manufactured tube sections.

5. The turbomachine fuel-air mixer component according to claim 4, further comprising: an additively manufactured peripheral flange formed with select ones of the plurality of additively manufactured tube sections.

6. The turbomachine fuel-air mixer component according to claim 5, wherein each of the plurality of additively manufactured tube sections extends from a first end section additively constructed upon the first end face of corresponding ones of the plurality of tube elements to a second end section through an intermediate section.

7. The turbomachine fuel-air mixer component according to claim 6, further comprising: an additively manufactured end plate additively constructed at the second end section of each of the plurality of tube elements.

8. The turbomachine fuel-air mixer component according to claim 7, further comprising: an additively manufactured side plate extending between the peripheral flange and the additively manufactured end plate, the additively manufactured side plate, peripheral flange, additively manufactured connecting webs and the additively manufactured end plate collectively form a plenum.

9. The turbomachine fuel-air mixer component according to claim 6, wherein each of the plurality of additively manufactured tube sections includes an opening formed in the intermediate section.

10. The turbomachine fuel-air mixer component according to claim 1, wherein the plurality of additively manufactured tube sections are formed through a selective laser melting process.

11. A method of forming a turbomachine fuel-air mixer component, the method comprising:
forming a first component portion of the turbomachine fuel-air mixer component through a non-additive manufacturing process, the first component portion of the turbomachine fuel-air mixer component having a plurality of tube elements each including an end portion; and
additively manufacturing a second component portion of the turbomachine fuel-air mixer component onto the first component portion of the turbomachine fuel-air mixer component, the second component portion including a plurality of additively manufactured tube sections that extend from respective ones of the end portions of the plurality of tube elements.

12. The method of claim 11, further comprising: supporting the plurality of tube elements in a corresponding plurality of openings formed in a locating plate.

13. The method of claim 12, further comprising: covering the alignment fixture in an additive manufacturing medium to a first depth.

14. The method of claim 13, further comprising: solidifying portions of the additive manufacturing medium to the first depth at end faces of each of the plurality of tube elements forming a first end section of each of the plurality of additively manufactured tube sections.

15. The method of claim 14, further comprising: submerging the alignment fixture in the additive manufacturing medium to a second depth that is greater than the first depth.

16. The method of claim 15, further comprising: solidifying portions of the additive manufacturing medium to the second depth at end portions of each of the plurality of tube elements to form a second end section of each of the plurality of additively manufactured tube sections.

17. The method of claim 14, further comprising: joining each of the additively manufactured tube sections through a plurality of additively manufactured connecting webs.

18. The method of claim 17, further comprising: additively manufacturing a peripheral flange with select ones of the plurality of additively manufactured tube sections.

19. The method of claim 18, further comprising: additively manufacturing an end plate joining end portions of each of the plurality of additively manufactured tube sections.

20. The method of claim 19, further comprising: additively manufacturing a side plate joining the peripheral flange and the end plate to form a plenum, each of the plurality of additively manufactured tube sections including additively formed openings exposed in the plenum.

* * * * *